United States Patent [19]
Jenke et al.

[11] Patent Number: 5,484,370
[45] Date of Patent: Jan. 16, 1996

[54] ROTATABLY SUPPORTED ROLL

[75] Inventors: Dietmar Jenke, Radevormwald; Josef Majsai, Huckeswagen; Winfried Wubken, Remscheid, all of Germany

[73] Assignee: Barmag AG, Remscheid, Germany

[21] Appl. No.: 252,222

[22] Filed: Jun. 1, 1994

[30] Foreign Application Priority Data

Jun. 2, 1993 [DE] Germany ............... 43 18 313.1

[51] Int. Cl.$^6$ ..................... B21B 29/00
[52] U.S. Cl. ............ 492/4; 492/5; 492/7; 492/16; 492/43; 492/44
[58] Field of Search ............ 492/4, 5, 6, 7, 492/16–20, 27, 49, 43, 44; 26/103

[56] References Cited

U.S. PATENT DOCUMENTS

| 710,327 | 9/1902 | Kling | 492/4 |
|---|---|---|---|
| 3,640,218 | 2/1972 | Allison | 492/4 |
| 3,707,749 | 1/1973 | Henley | 492/4 |
| 4,455,727 | 5/1984 | Tschirner . | |
| 4,557,028 | 12/1985 | Eibe | 492/4 |

FOREIGN PATENT DOCUMENTS

| 2815892 | 9/1979 | Germany | 492/4 |
|---|---|---|---|
| 3105171 | 3/1983 | Germany . | |
| 0015001 | 10/1915 | United Kingdom | 492/4 |

OTHER PUBLICATIONS

"Die, Schwimmende Walze" als neues Maschinenelement für Walzmaschinen, E. Küsters, Melliand 39–Jan. 1958, pp. 88–90.

Die gummierte Walze, F. Zeppernick, Köln, Ein Maschinenelement in der Textillndustrie, Teil XIV**, pp. 647–649.

Die Schwimmende Walze, ihre Funktion, Vorzüge und Anwendung, F. Leifeld, Krefeld, Melliand Textilberichte Aug. 1972, pp. 935–940.

Neue Durchbiegungs–Ausgleichswalze und ihre Regelmöglichkeiten, K. Meisen, Krefeid, Melliand Textilberichte Mar. 1986, pp. 184–188.

Primary Examiner—Irene Cuda
Attorney, Agent, or Firm—Bell, Seltzer, Park & Gibson

[57] ABSTRACT

A rotatably supported roll (1), which is adapted to form a nip with a second roll, so as to advance therebetween a web of material. The load in the nip between the rolls can be controlled by an adjustable camber. To this end, an interior hollow space (13) is provided in the roll (1), which is filled with an incompressible pressure medium, and put under a controlled pressure, so as to cause the roll jacket (10/12) to bulge radially outwardly. This bulging can be significantly supported and influenced by a predetermined progression of the wall thickness of the jacket (10/12) in the axial direction of the roll.

14 Claims, 2 Drawing Sheets

ROTATABLY SUPPORTED ROLL

BACKGROUND OF THE INVENTION

This invention relates to a rotatably supported roll, which is adapted to form a nip with another roll in a film production line or the like.

Rolls of the described type are known, and they are used in (two and multi-roll) systems to compensate for the bending of conventional, cylindrical rolls along the nip between the rolls, and to adjust a uniform distribution of the pressure over the entire length of the nip between the rolls (see, German trade journal tpi 1991, July, pp. 647–649). In this instance, the bulging or camber of the roll jacket in the axial direction of the roll is calculated and constructed for a type of load which is determined by certain parameters. It is therefore operational only for this special operating condition and, when load conditions change, it would have to be adjusted to these new load conditions. However, cambered rolls are mostly solid core rolls, the jacket of which is turned and ground with the determined bulging in a costly machining process. They represent thus an essentially rigid system, which does not permit an adjustment to changed operating parameters.

To compensate for the bending of the rolls due to a load in the nip between the rolls, other constructional solutions have been previously proposed. In these roll systems, for example, the roll jacket is supported by hydraulic forces on a stationary shaft ("floating roll" or "S roll", see Melliand Textilberichte 39/1(1958), pp. 88–90; and 53/8(1972), pp. 935–940; or also "Nipco roll"), or it is intended to accomplish by the arrangement of several pressure zones and their individual pressure application that the bending line of the roll can be adapted to the respective operating condition (DE 31 05 175 C2; German journal Melliand Textilberichte 67/3(1986), pp. 184–188).

The known systems, in which a bending is equalized by a hydraulic support of the roll jacket, are technically very costly, and the costs of investment for such systems are therefore very high. As a result they have been realized essentially only in the construction of calendar lines. Furthermore, they are unsuitable for additional tasks, for example, when it is necessary to actively cool the roll jacket in a film casting line or in a calendar, so as to dissipate a large amount of heat, so that the resin is cooled below its solidification point and solidified on the roll.

It is the object of this invention to provide a roll of the described type, in which the bulging of the roll jacket may be adjusted in a controlled manner and can be adapted for operation with different operating parameters, without removing the roll.

SUMMARY OF THE INVENTION

The above and other objects and advantages of the present invention are achieved by the provision of a roll which comprises a pair of axially spaced apart end disks, with each of the disks including an outwardly extending axial journal. A jacket is fixed between the disks so as to define a closed chamber therebetween, and an incompressible liquid fills the chamber. Means are also provided for controllably pressurizing the liquid in the chamber so as to cause the jacket to radially bulge to a controlled extent.

The roll of the present invention permits the camber of its jacket to be formed with simple means, and permits the camber to be adjusted to a desired configuration of the nip between rolls, or to readjust it, when operating conditions are changed.

In the preferred embodiments of the invention, the roll is constructed as a pressure-tight, hollow cylinder, which is filled with a liquid pressure medium, and which forms a self-contained system. This system can be put under a sufficient pressure so that its pressure biased peripheral surfaces are elastically deformed. It is also possible to include the wall thickness of the roll jacket in the constructional configuration and to design the wall thickness of the roll jacket to progress such that, with a fixed interior pressure of the roll, the bulging of the roll jacket is directed oppositely to the bending line of the roll under the intended load in the nip between the rolls, and that it is oriented by same with respect to its extent. Depending on the manufacturing costs, also approximate solutions may be very advantageous. Same may be corrected and optimized by improved calculation methods and empirical data, which are obtained from measurements made on the products. After having finalized the thickness profile of the roll jacket, it is possible, when changing the load parameters in the nip between the rolls, to further adapt the camber of the roll jacket by increasing or decreasing the interior pressure of the roll. This occurs, in particular hydromechanically, by one or more piston-cylinder units which are formed in the two end disks of the roll, for example, threaded plugs, and which can be adjusted very finely in the axial direction. When used in a calendar, the roll of this invention can be adapted for heating or cooling.

In one preferred embodiment, the roll includes a cylindrical roll core which extends axially through the end disks, and with the axial end regions of the core forming opposite end journals for the roll. This embodiment results in the volume of the roll which is under the interior pressure to be decreased.

BRIEF DESCRIPTION OF THE DRAWINGS

Some of the objects and advantages of the present invention having been stated, others will appear as the description proceeds, when considered in conjunction with the accompanying drawings, in which.

DETAILED DESCRIPTION OF THE PREFERRED EMBODIMENTS OF THE INVENTION

Figure 1:
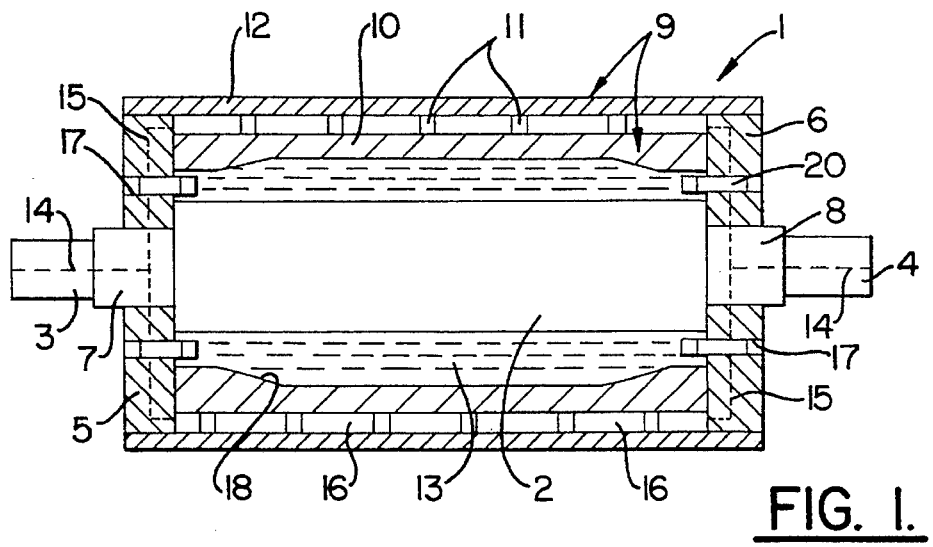
FIG. 1 is an axial sectional view of a roll which embodies the present invention.

FIG. 1 is a schematic, axial sectional view of an embodiment of a roll 1 in accordance with the invention. The roll consists of a core 2 with end journals 3, 4 for supporting the roll 1 in bearing blocks (not shown) of a multi-roll arrangement, for example a calendar, a cooling and/or casting roll arrangement, or the like, the bearing blocks of cooperating rolls being movable for adjusting the nip or gap between the rolls mechanically, hydraulically, or any other manner, to a defined degree. Arranged at both ends of the roll 1 are end disks 5, 6, which are connected fixedly and in fluid-tight manner with a cylindrical core 2 or collars 7, 8 of the core 2. Axially clamped in between the end disks 5, 6 as well as in concentric arrangement with the core 2 is a coolable jacket 9. In each of the illustrations of FIGS. 1 and 2, the jacket consists of a hollow interior cylinder 10 which includes a cylindrical exterior surface, and an exterior sleeve 12 which coaxially surrounds the exterior surface in a spaced apart arrangement so as to define an annular space therebetween. Ribs 11 are spirally wound about the exterior surface of the interior cylinder and comprise, for example, a flat or profiled steel band stapled or welded thereon. The sleeve 12 may be axially slipped thereover and radially supported on the ribs 11. The jacket 9 is thus constructed as a cross sectionally circular hollow cylinder.

The structural parts of the roll jacket 9 are also connected with the end disks 5, 6 in a fluid-tight manner and a manner substantially resistant to compression. Thus a closed chamber 13 is formed radially between the core 2 and the hollow cylinder 10 and axially between the end disks 5, 6 to be put under an increased pressure. Also, it is possible to temper the sleeve 2 from the inside of the roll 1, and to supply or dissipate the heat, as is necessary from the viewpoint of process engineering. To this end, axial ducts 14 shown in dashed lines are provided in the journals 3, 4, and in collars 7, 8, and radial ducts (15) are provided in the end disks 5 and 6. The latter terminate in the spiral channel 16 formed between the surfaces 10 and 12 by the ribs 11. When the roll is biased by the tempering medium, the latter is supplied at one of journals 3, 4 and discharged at the other journal 4, 3.

Figure 2:
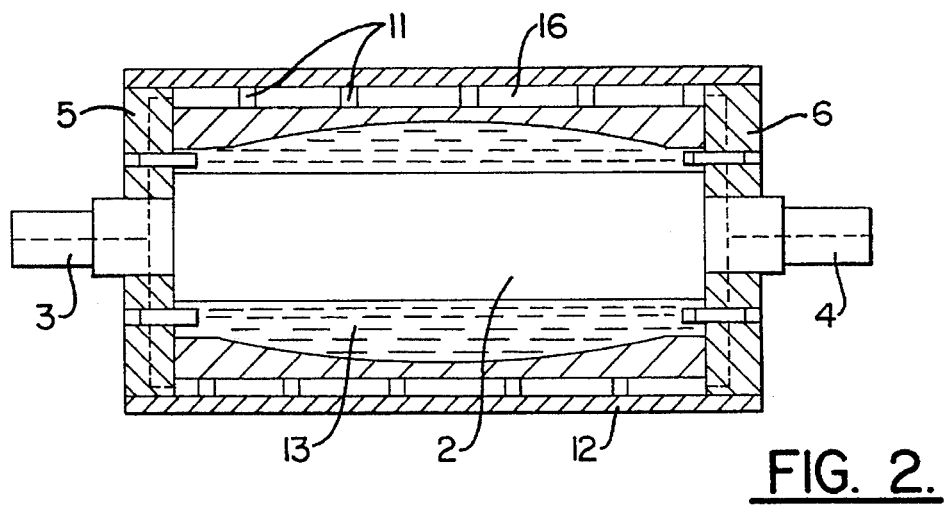
FIG. 2 shows a modified embodiment of the roll of FIG. 1.

To even the flow of heat across the width of the roll, it may further be provided that the pitch of the ribs 11 and thus the pitch of the spiral channel, as shown in FIG. 2, are changed such that the pitch of ribs 11 decreases in the direction of flow. This means, that when the temperature of the heat carrier rises, the flow rate increases for adequate cooling of the roll, and that the average dwelling time of the heat carrier is reduced in the flow direction of the roll.

As noted above, the jacket 9 and the end disks 5, 6 define a closed chamber 13, which is constructed as a pressure-tight, hollow cylinder, and hermetically sealed all around. It is only accessible through several bores 17, which are arranged on a radius between core 2 and inner wall 18 of hollow cylinder 10 and distributed in a circumferential direction in the end disks 5, 6.

Figure 3:
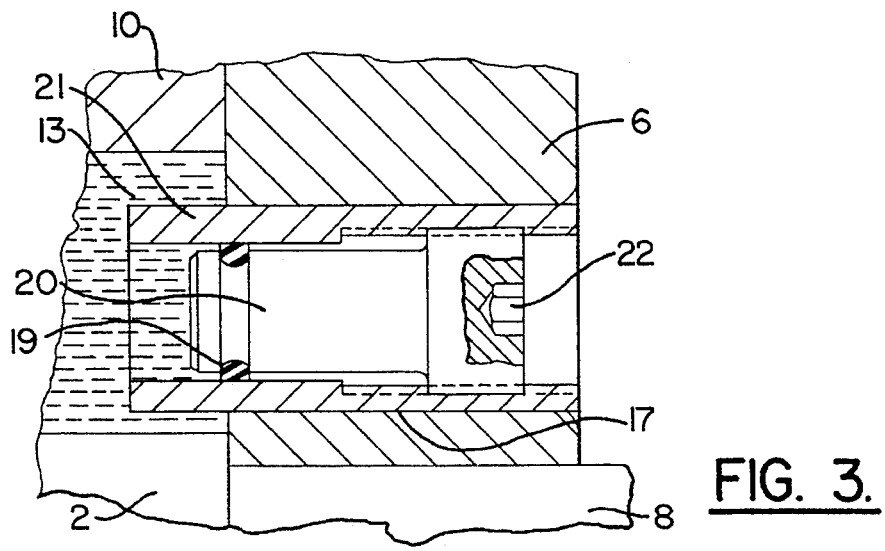
FIG. 3 is a detail view of the pressure variation device at the head end of the roll.

FIG. 3 illustrates the structure of one of the bores 17, which includes a sleeve 21 and a plug 20 axially adjustable therein and radially sealed by an O-ring 19. The sleeve 21 is welded into end disk 6, and projects axially into annular chamber 13. Also, the sleeve 21 is provided with an internal thread over a portion of its length, whereas in the inward portion, the bore is made smooth for receiving an unthreaded portion of the plug 20.

Before starting the operation of the roll 1, hollow space 13 is filled, after removal of one or more of the plugs 20 at one end of roll 1, with an incompressible, flowable medium. Such medium may be a degassed hydraulic oil, an incompressible gel, and any other suitable fluid. Once the annular chamber 13 is entirely filled, the plugs 20 are replaced into the threaded bores 17 and axially adjusted by means of hexagonal recess 22. This leads to an increase of the interior pressure in the annular chamber 13, which can be read on a pressure gauge (not shown). A further axial adjustment of the plugs 20 allows the interior pressure in annular chamber 13 to be increased so much that the roll jacket 10/2 bulges, somewhat stronger in the axial center of the roll 1 than in the region of the clamping points at the head ends of the roll. Thus, when roll is used in a calendar, an adjustment of the interior pressure in annular chamber 13 of the roll 1 allows to equalize at least in part the bending, which is caused by its own weight and the contact pressure in the nip between rolls. A more accurate adjustment of the camber of the roll is accomplished after measuring the progression of the thickness of a web or material being squeezed through the nip between rolls in the transverse direction, and after an adaption of the interior pressure in the annular chamber 13.

A characteristic of the roll of FIGS. 1 and 2 can be seen in that the inside wall 18 of hollow cylinder 10, which radially defines annular chamber 13, has a variable diameter, when viewed over the length of the roll. Same is smaller at the head ends of the roll 1, and increases in the direction toward the axial center of the roll 1, preferably symmetrically from its head ends toward its axial center. This increase may proceed unevenly in steps, or preferably steadily, in particular, along a parabolic curve, when viewed in axial direction. As shown in FIG. 1, the inner wall 18 of the annular space 13 has two regions with a constant small diameter at the head ends of the roll 1, a region with a constant larger diameter in the axial center of the roll 1, and therebetween a region with a diameter linearly increasing from a smaller to a larger diameter.

The measure of weakening the wall thickness, as described, allows the bulging or camber of the roll to be influenced and adjusted in a controlled manner. A recalculation is possible by the method of finite elements. Thus a person skilled in the art can adapt the roll of the present invention to the requirements of an intended line pressure in the nip between rolls, which by experience varies for the different materials. As a result, it is possible to make a product with a cross sectionally constant wall thickness or a defined profile.

When later in the production process cross sectional deviations of the endless product are found, for example, by a continuous thickness control, it will be possible to correct the roll camber while interrupting the operation, in that the interior pressure in annular space 13 of roll the 1 is adapted by an adjustment on one or more plugs 20. It is also possible to automate this procedure, in that a torque motor activated by a thickness measuring device, or a different rotary drive with a stepping motor engages on one of the plugs 20 and adjusts same, until the thickness measuring device for the processed endless material detects the smallest deviations from predetermined set point values or from a corresponding set point profile.

It should be pointed out that, with respect to the construction of the rolls, modifications are possible, without departing from the concept of the present invention. Thus, it is not absolutely necessary that the interior of the roll 1 accommodates a core 2. Rather, it is also possible to weld the lateral journals 3, 4 or collars 7, 8 into end disks 5, 6, so that they are not interconnected by core 2. This allows a roll 1 having a hollow cylinder 10 to be provided with a larger volume.

In many applications, however, the solution shown in the drawing is preferred, since the arrangement of the core 2 provides a greater rigidity to the roll 1, and only a limited space is available for filling the fluid, thereby reducing the product of pressure and liters.

Figure 4:
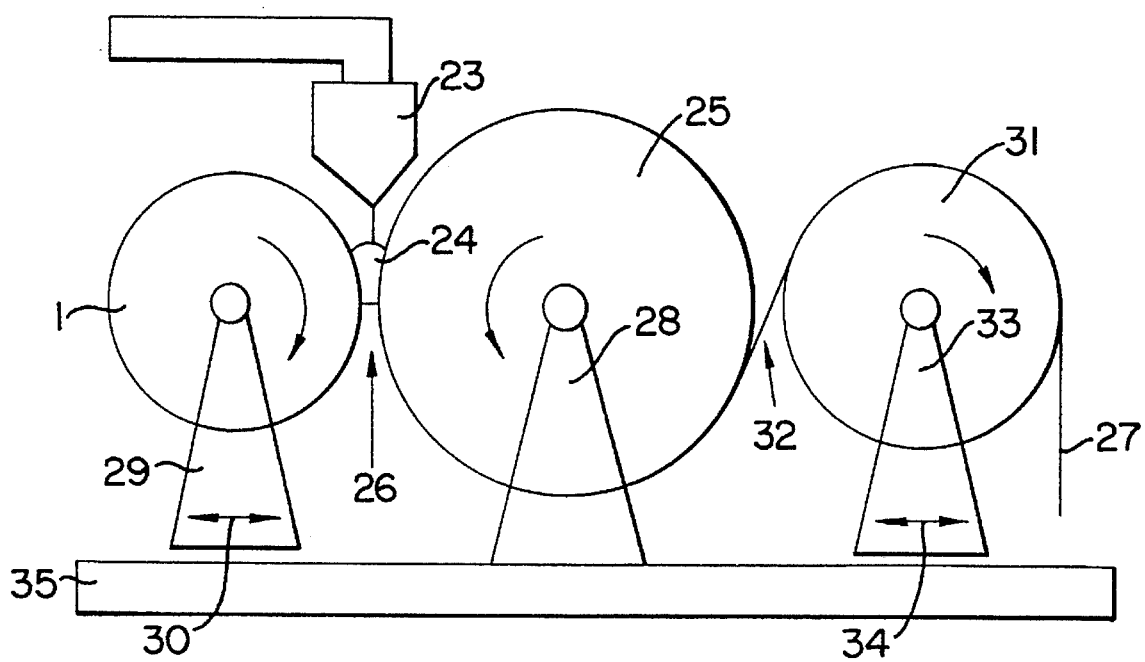
FIG. 4 is a schematic view of a portion of a film production line with a wide slot die and a casting roll arrangement.
Figure 5:
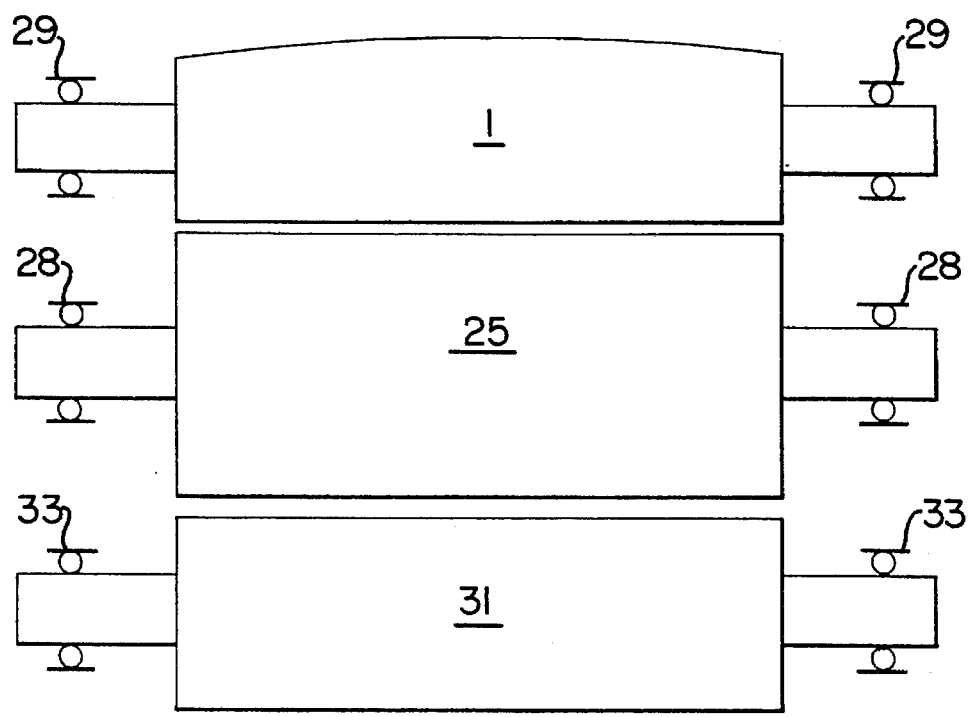
FIG. 5 is a top view of the casting roll arrangement of FIG. 4.

FIGS. 4 and 5 illustrate schematically a side view and a top view of a portion of a film production line with a die and an arrangement of casting rolls. The die is, for example, a wide-slot die 23, and connected to an extruder (not shown), which is used for melting and extruding in particular a thermoplastic plastic. The extruded plastic mass 24 arrives at the nip 26 formed between the arrangement of rolls 1 and 25 and, before entering, it forms there a bead-shaped kneading mass depending on the feed, from which a film 27 is formed in the nip between the rolls. Roll 25 which is supported for rotation in stationarily arranged bearing blocks 28, has a relatively large diameter and is rotatingly driven. It is cooled on the inner surface of the roll jacket, so as to remove from the plastic adequate heat for its faster solidification. In accordance with the invention, the roll 25 cooperates with a further roll and forms the nip 26 with the jacket of this roll . To this end, roll 1 is supported for rotation with its journals 3, 4 in bearing blocks 29, and it is adjustable with same in direction of arrow 30, so as to produce a film of the desired thickness. Roll 1 is likewise driven and cooled on its jacket, i.e. on the working surface of the sleeve 12. To produce films of a small thickness, it is necessary to apply great forces in the nip 26, which leads to a bending of the surface of the roll 1. This is compensated for, in that roll 1 of the present invention is cambered with a predetermined shape.

In operation, as shown in FIG. 5, the roll 1 is elastically deformed in nip 26 such that the nip appears to be straight (FIG. 5). It should be noted that in FIGS. 4 and 5, the nip 26 between the rolls is shown enlarged for a better illustration. In actual operation, with an overall working width of the roll of about 1800 mm and a diameter of 400 mm, the bulging of the roll amounts to about 100 µm, in the production of a film, in which a line load of approximately 50 N/mm is present in nip 26. To produce the camber, an internal pressure of about 300 bar is applied. The film web 27 exiting from the nip 26 continues to advance along roll 25 over an angle of about 180°, and is then transferred to a faster driven draw roll 31, it being drawn in a narrow, adjustable gap 32. To adjust the width of the draw gap 32, the bearing blocks 33 supporting draw roll 31 are displaceable and adjustable in direction of arrow 34.

In the drawings and specifications, there has been set forth a preferred embodiment of the invention, and although specific terms are employed, they are used in generic and descriptive sense only and not for purpose of limitation.

That which is claimed is:

1. A roll adapted to form a nip with another roll in a film production line, and which is characterized by the ability to permit the nip to be readily adjusted, said roll comprising a pair of axially spaced apart end disks, with each of said disks including an outwardly extending axial journal, a jacket fixed between said disks so as to define a closed chamber therebetween and so that said journals are coaxially aligned, said jacket comprising a hollow interior member which includes a cylindrical exterior surface, and an exterior member coaxially surrounding said exterior surface of said interior member in a spaced apart arrangement so as to define an annular space therebetween.

an incompressible liquid filling said chamber, and means for controllably pressurizing said liquid in said chamber so as to cause the jacket to radially bulge to a controlled extent, and comprising at least one axial opening extending axially through at least one of said disks, with said one opening including an internally threaded bore which communicates with said chamber, and a threaded plug threadedly mounted in said threaded bore in an axially adjustable manner so as to permit adjustment of the pressurization of the liquid in said chamber.

2. The roll as defined in claim 1 wherein said jacket is fixed between said disks in a pressure tight manner.

3. The roll as defined in claim 2 wherein said jacket has a non-uniform radial wall thickness, and such that the radial wall thickness is more thick adjacent each of said disks than it is at a medial location between said disks.

4. The roll as defined in claim 3 wherein the progression of the wall thickness, when viewed in axial cross section, is symmetric to the axial center of the roll.

5. The roll as defined in claim 3 wherein the progression of the wall thickness, when viewed in the axial cross section, includes opposite end portions of relatively large thickness, a medial portion of lesser thickness and a portion of tapered thickness between the medial portion and each end portion.

6. The roll as defined in claim 3 wherein the progression of the wall thickness, when viewed in axial cross-section, steadily varies so as to define a parabolic function.

7. The roll as defined in claim 1 wherein said roll further comprises internal duct means by which a heating or cooling fluid can be circulated axially through said annular space.

8. The roll as defined in claim 7 wherein said jacket further comprises spirally extending ribs positioned within said annular space so as to define an internal spiral channel, and wherein said duct means communicates with said internal spiral channel for supplying a heating or cooling medium therethrough.

9. The roll as defined in claim 8 wherein said internal spiral channel, when viewed in the direction of flow, has a decreasing pitch.

10. The roll as defined in claim 1 wherein said roll further comprises rib means positioned in said annular space for transferring bulging forces from said interior member to said exterior member.

11. A roll adapted to form a nip with another roll in a film production line, and which is characterized by the ability to permit the nip to be readily adjusted, said roll comprising a cylindrical roll core, a pair or axially spaced apart end disks mounted on said core, and such that the axial end regions of the core extend beyond the respective end disks and form respective journals, a jacket fixed between said disks so as to define a closed chamber defined by said disks, said roll core, and said jacket, said jacket comprising a hollow interior member which includes a cylindrical exterior surface, and an exterior member coaxially surrounding said exterior surface of said interior member in a spaced apart arrangement so as to define an annular space therebetween, an incompressible liquid filling said chamber, and means for controllably pressurizing said liquid in said chamber so as to cause the jacket to radially bulge to a controlled extend.

12. The roll as defined in claim 11 wherein said roll further comprises internal duct means by which a heating or cooling fluid can be circulated axially through said annular space.

13. A roll adapted to form a nip with another roll in a film production line, and which is characterized by the ability to permit the nip to be readily adjusted, said roll comprising a pair of axially spaced apart end disks, with each of said disks including an outwardly extending axial journal, a jacket fixed between said disks so as to define a closed chamber therebetween and so that said journals are coaxially aligned, said jacket comprising a hollow interior member which includes a cylindrical exterior surface, and an exterior member coaxially surrounding said exterior surface of said interior member in a spaced apart arrangement so as to define an annular space therebetween, an incompressible liquid filling said chamber, and means for controllably pressurizing said liquid in said chamber so as to cause the jacket to radially bulge to a controlled extent.

14. The roll as defined in claim 13 wherein said roll further comprises rib means positioned in said annular space for transferring bulging forces from said interior member to said exterior member.

* * * * *